Sept. 8, 1970            E. L. TOMPSETT            3,527,417
WHEELED COMMINUTING MACHINE
Filed Feb. 1, 1968                          4 Sheets-Sheet 1
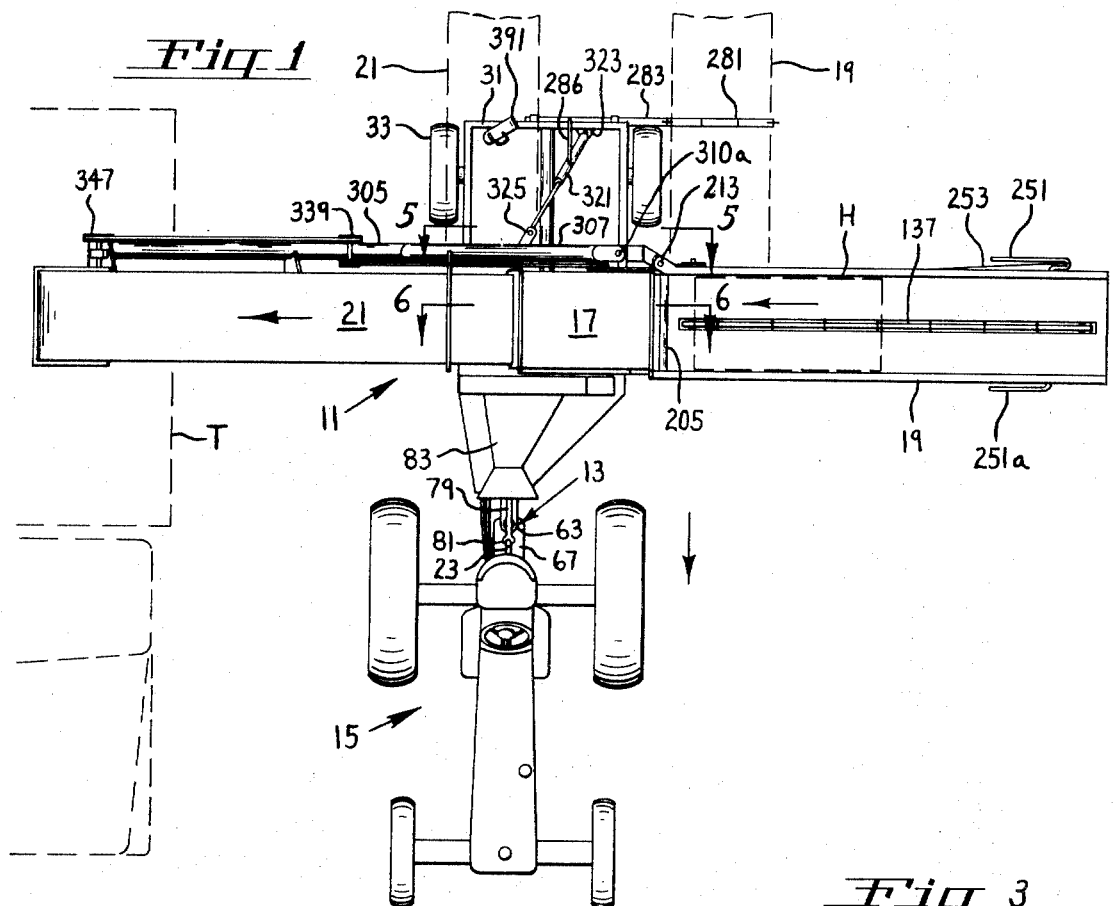
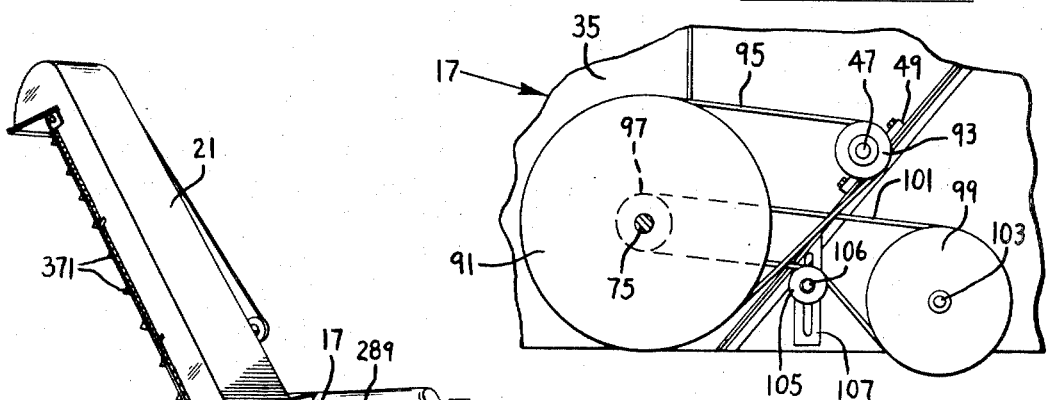
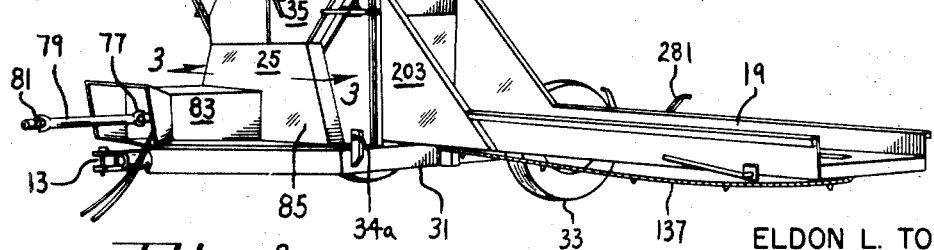
ELDON L. TOMPSETT
INVENTOR.
BY
BUCKHORN, BLORE, KLARQUIST & SPARKMAN
ATTORNEYS Sept. 8, 1970  E. L. TOMPSETT  3,527,417
WHEELED COMMINUTING MACHINE
Filed Feb. 1, 1968  4 Sheets-Sheet 2
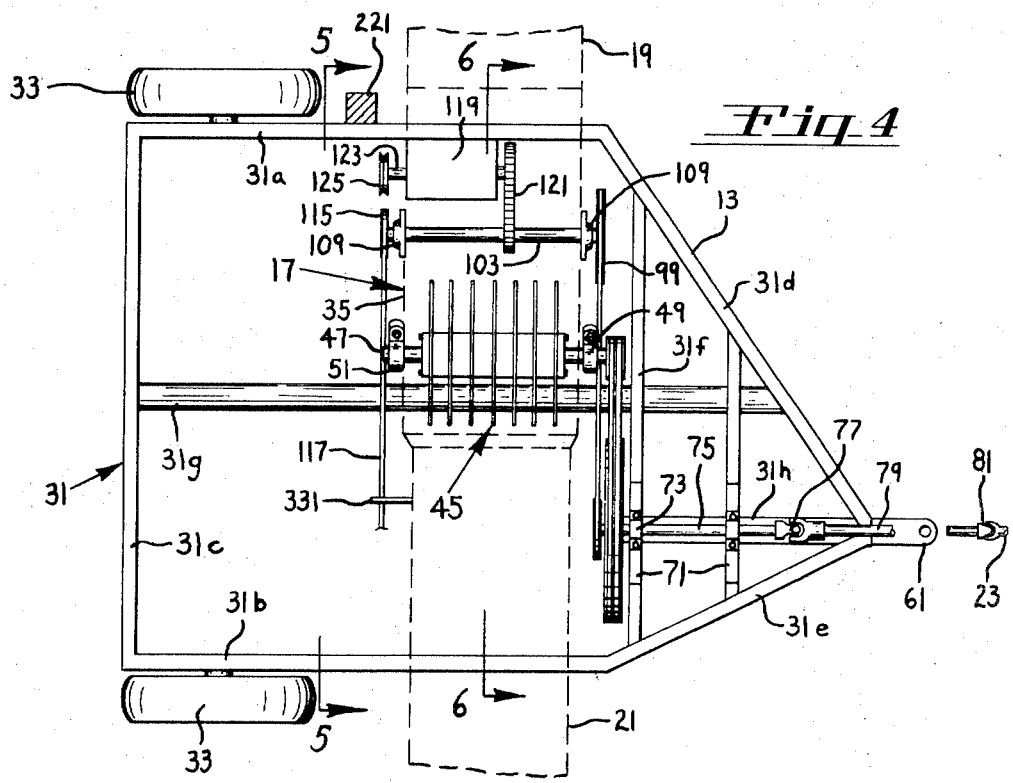
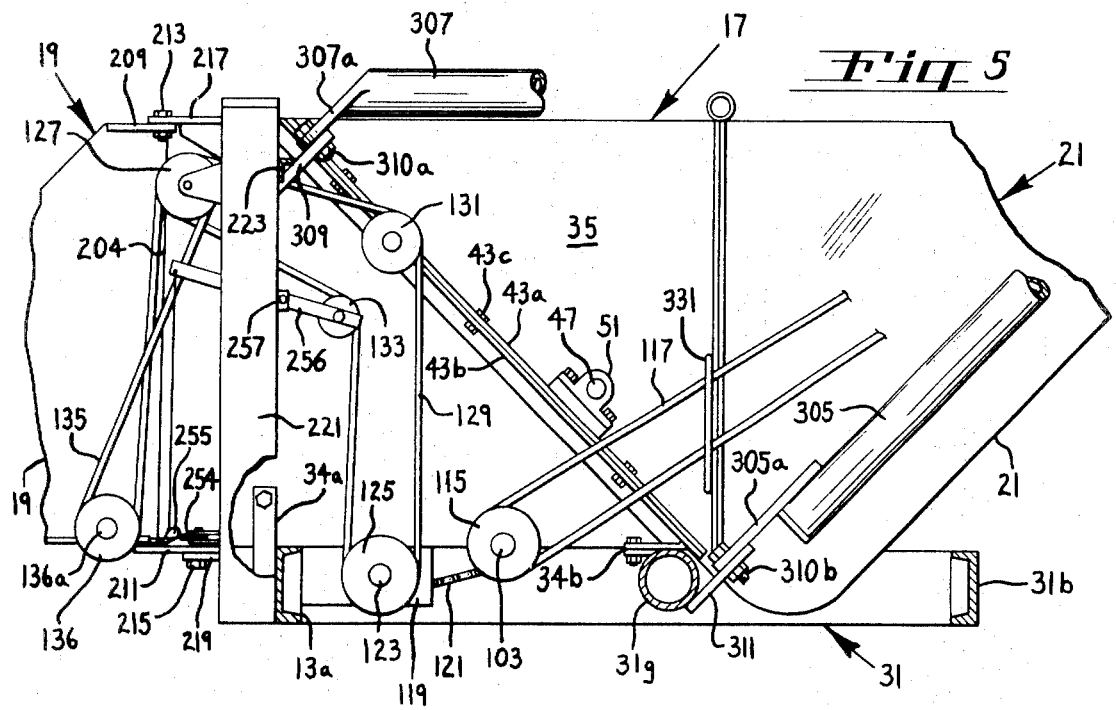
ELDON L. TOMPSETT
INVENTOR.
BY
BUCKHORN, BLORE, KLARQUIST & SPARKMAN
ATTORNEYS

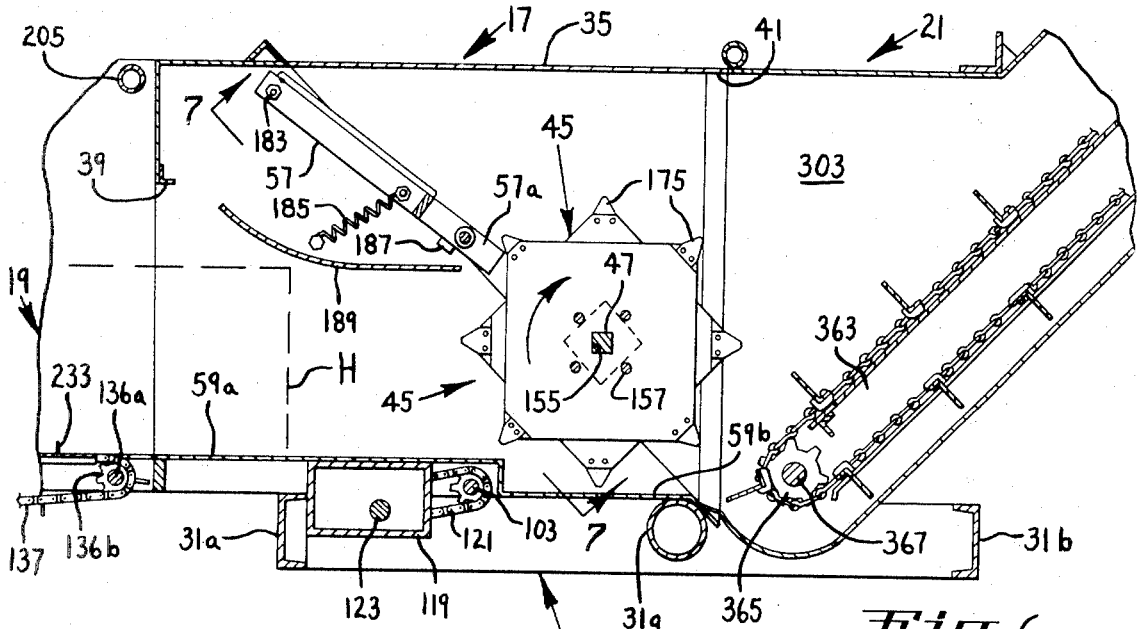
Fig_6
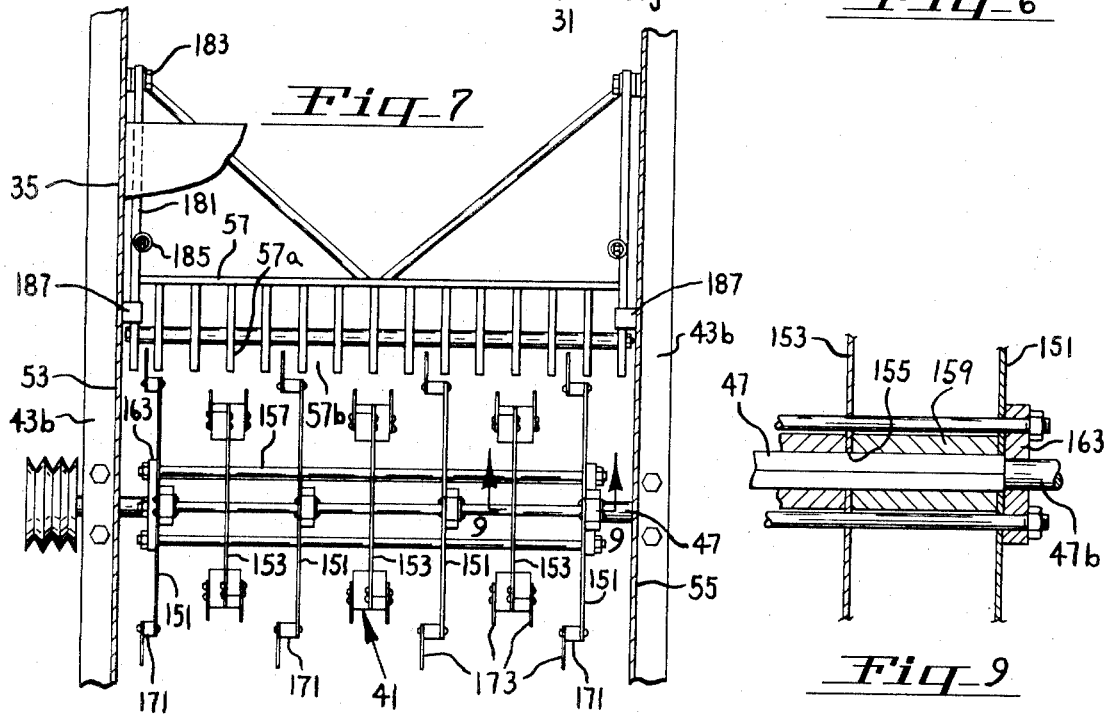
Fig_7
Fig_9
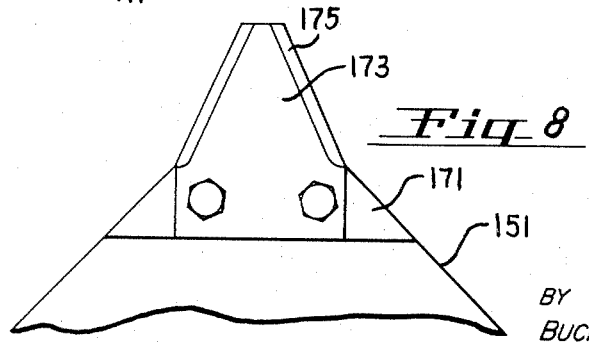
Fig_8
ELDON L. TOMPSETT
INVENTOR.
BY
BUCKHORN, BLORE, KLARQUIST & SPARKMAN
ATTORNEYS

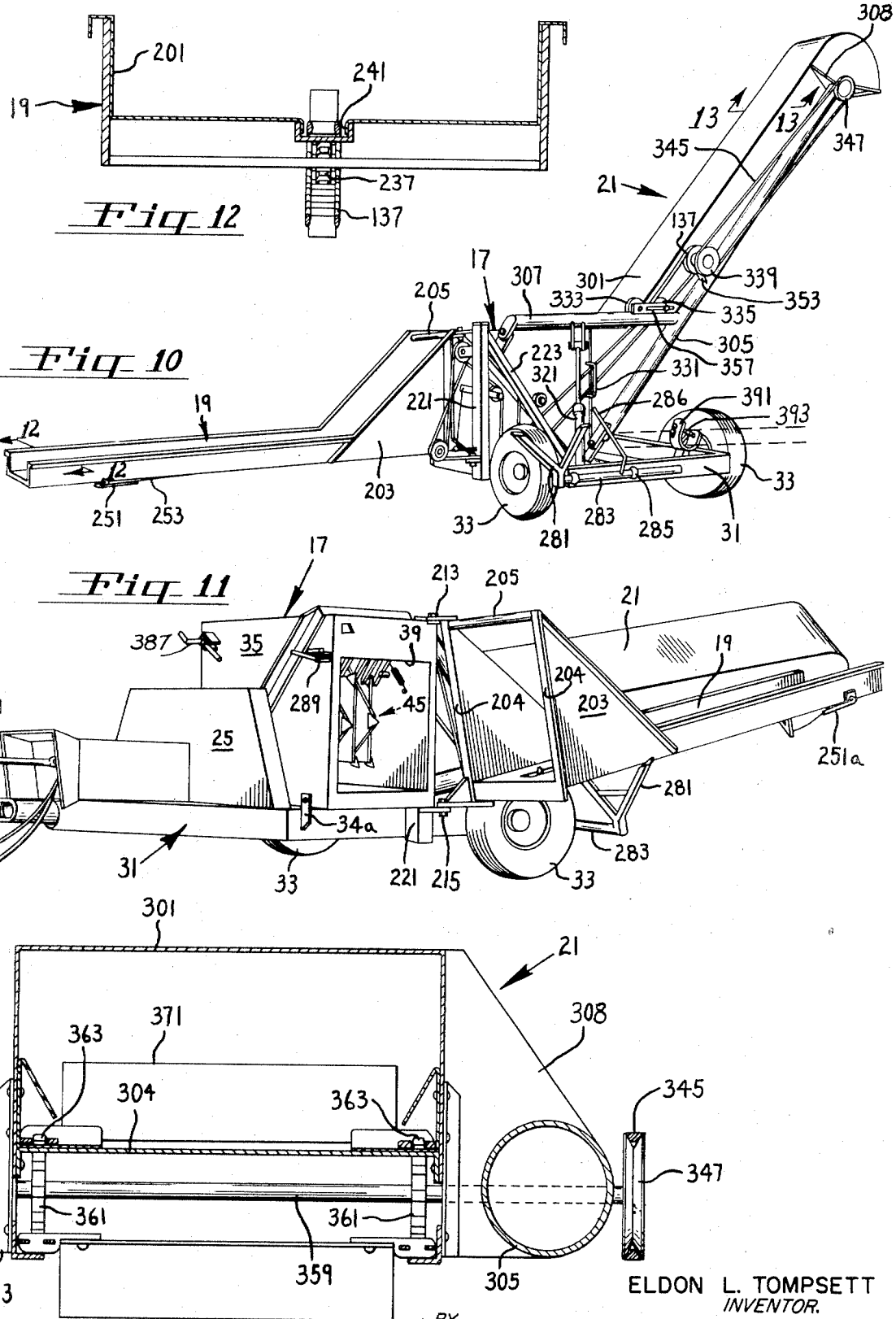

United States Patent Office 3,527,417
Patented Sept. 8, 1970

3,527,417
WHEELED COMMINUTING MACHINE
Eldon L. Tompsett, Rte. 1, Box 464,
Madras, Oreg. 97441
Filed Feb. 1, 1968, Ser. No. 702,368
Int. Cl. B02c *18/22*
U.S. Cl. 241—101                7 Claims

ABSTRACT OF THE DISCLOSURE

A wheeled comminuting machine mainly for field use having either a discharge conveyor or an infeed conveyor, and preferably both, which in their operative positions extend transversely of the machine but are foldable to back to out-of-the-way trailing poositions when the machine is moved from one place to another.

BACKGROUND OF THE INVENTION

Heretofore, most of the hay shredding machines and similar machines of which I am aware have comprised wheeled apparatus to be hitched in one position to a tractor to be drawn from one place to another with the infeed and outfeed conveyors generally aligned with the direction of travel, such alignment being necessitated because of clearance requirements along the route usually traveled. In use of the apparatus, the tractor is disconnected therefrom and drivingly coupled to the apparatus at a place thereon 90° from the hitch. This is not only time-consuming, but the discharge conveyor is usually sharply upwardly inclined so that it can discharge shredded material into a truck. This means that the discharge end is at a substantial elevation and there is danger of it becoming entangled in trees and low level power and telephone lines.

SUMMARY OF THE INVENTION

In my inventive machine, the wheeled apparatus is designed to remain hitched to the tractor, from which it receives power, in both the operating and travelling conditions of the apparatus, and the infeed and discharge conveyors are mounted for movement from laterally extending operating positions (and upwardly extending in the case of the discharge conveyor) to out-of-the-way trailing positions with the discharge conveyor at a lower level than in its operative position.

BRIEF DESCRIPTION OF THE DRAWINGS

FIG. 1 is a plan view of the apparatus of the present invention hitched to a farm tractor and showing in broken lines a related vehicle to be loaded, and further showing in broken lines the conveyors swung to their trailing inoperative positions;

FIG. 2 is a front right perspective view of the apparatus with the conveyors in their operative positions;

FIG. 3 is an enlarged vertical sectional view taken in the direction of the arrows 3—3 of FIG. 2 with the cover plate removed;

FIG. 4 is a plan view of the frame of the apparatus with the conveyors and shredder box shown in broken lines;

FIG. 5 is a fragmentary elevational view of part of the drive of the apparatus taken in the direction of the arrows 5—5 of FIG. 1, related arrows 5—5, being shown in FIG. 4;

FIG. 6 is a vertical sectional view taken along line 6—6 of FIG. 4;

FIG. 7 is a sectional view taken in the direction of the arrows 7—7 of FIG. 6 with parts broken away for convenience in illustration;

FIG. 8 is an enlarged plan view of one of the tip portions of one of the shredding blades;

FIG. 9 is an enlarged fragementary sectional view taken along lines 9—9 of FIG. 7;

FIG. 10 is a rear right perspective view of the apparatus with the conveyors in their operative positions;

FIG. 11 is a front right perspective view of the apparatus showing the conveyors swung to their inoperative trailing positions;

FIG. 12 is a vertical enlarged sectional view taken along line 12—12 of FIG. 10;

FIG. 13 is an enlarged sectional view taken along line 13—13 of FIG. 10.

GENERAL DESCRIPTION

The equipment shown in FIGS. 1 and 2 includes a bale shredding machine 11 of the present invention connected by a hitch 13 to a conventional farm tractor 15. The shredding machine 11 includes a shredder 17 receiving bales H to be shredded from a generally horizontal infeed conveyor 19, and discharging shredded hay into a truck T via an upwardly inclined discharge conveyor 21. When the conveyors are in their operative positions shown in solid lines in FIGS. 1 and 2 (and described above) they extend in a direction normal to the longitudinal axis of the tractor 15. The conveyors are mounted so that they may be swung to inoperative transporting trailing positions with respect to the shredder 17, as shown in broken lines in FIG. 1 and in full lines in FIG. 11, with the infeed conveyor being pivoted so as to swing rearwardly and slightly upwardly, and with the discharge conveyor 21 being pivoted so as to swing rearwardly and downwardly with a rolling action to be described.

There are latch means, to be described, for latching the conveyors in both their operative and inoperative positions. When the conveyors are in their operative positions, they and the shredding unit are driven by a power take off shaft 23 (FIGS. 1 and 2) of the tractor 15 via a belt and pulley mechanism to be described.

SPECIFIC DESCRIPTION

The shredding machine has a generally horizontal frame 31 (FIGS. 4 and 2) of open generally rectangular form which is supported by a pair of wheels 33 located adjacent the rear end of the frame. The shredder 17 includes a hollow shredder box 35 (FIGS. 2, 4 and 11) bolted onto lugs 34a and 34b (FIGS. 11, 2 and 5) onto the frame 31 in somewhat offset relationship to the centerline of the frame, the box being open in a horizontal transverse direction (FIGS. 6 and 11) and thus has an inlet opening 39 (FIG. 11), which as shown in FIG. 6 is normally in register with and normally closed by the infeed conveyor 19 and has an outlet opening 41 (FIG. 6) in register with and normally closed by the discharge conveyor 21.

In the particular embodiment of the box 35 shown, the box is formed of two generally triangular box sections equipped with reinforcing flanges 43a and 43b secured together by bolts 43c. The box may be otherwise formed if desired.

The shredder 17 has a shredding head 45 (FIGS. 4, 6 and 7) located within the box 35 and having a shaft 47 mounted for rotation about a longitudinal axis by bearings 49 (FIG. 3) and 51 (FIGS. 4 and 5) mounted on the front and rear walls of the box 35 on the flanges 43a (FIG. 5). The head 45 cooperates with the teeth or bars of a bar set 57 in the box 35 to shred bales of hay H (FIG. 6) fed into the rotating head along the floor of the box by the infeed conveyor 19. The floor is stepped so as to have a raised inlet portion 59a and a lowered output portion 59b.

Now, referring more specifically to the frame 31 (FIG. 4), it has parallel side members 31a and 31b, a rear cross member 31c, forwardly and inwardly extending front members 31d and 31e, and a front cross member 31f. The frame further includes a first longitudinal member 31g centrally disposed between the side members 31a and 31b and supporting the output end of the box 35 (FIGS. 4 and 5). The frame has a second longitudinal member 31h extending from the front cross member 31f forwardly and terminating in a hitch clevis 61. The clevis is coupled by a pin 63 (FIG. 1) to the tractor drawbar 67.

The front portion of the frame 31 has raised bearing supports 71 (FIG. 4) having bearings 73 supporting the input shaft 75 of the shredding unit. The input shaft is connected by a universal joint 77 to an extension shaft 79 (FIGS. 1 and 4) which in turn is connected by a universal joint 81 to the power take off shaft 23 of the tractor. The supports 71 and bearings 73 are concealed by a cover 83 in FIGS. 1 and 2.

A belt and pulley mechanism shown in FIG. 3 is normally enclosed by a cover 85 in FIG. 2. The mechanism includes a plural groove pulley 91 on the input shaft 75 which drives a plural groove pulley 93 on the shredder shaft 47 by means of plural belts 95. The pulley 91 is substantially larger than pulley 93 so that there is a drive step up from the input shaft to the shredder shaft. The shredder rotates quite rapidly, i.e., around 2200 r.p.m. in one device incorporating the concepts of the present invention wherein the power take off shaft rotated at 540 r.p.m.

There is a second pulley 97 (FIG. 3) on the input shaft 75 which drives a pulley 99 via a belt 101, pulley 97 being smaller than pulley 91 and smaller than pulley 99 so that there is a step down in speed from input shaft 75 to a conveyor drive shaft 103 to which pulley 99 is secured. There is a belt tensioning idler pulley 105 adjustably mounted by a bolt shaft 106 on a slot plate 107 which is secured to the flange 43a on the box 35.

The conveyor drive shaft 103 (FIGS. 3, 4 and 6) is mounted by bearings 109 (FIG. 4) so as to pass beneath the raised floor portion 59a (FIG. 6) of the box 35. A pulley 115 (FIG. 5) on the rear end of the shaft 103 drives a belt 117 which drives the discharge conveyor in a manner to be described presently.

The conveyor drive shaft 103 drives a speed reduction gear unit 119 (FIGS. 4 and 5) mounted beneath the shredder box 35, by a chain drive 121, the output shaft 123 of the gear unit having a pulley 125 (FIG. 5) which drives a double idler pulley 127 via a belt 129. The belt passes over a stationary idler 131 and over a clutching idler 133 (about which more will be presently said). A cross belt 135 from the double pulley 127 drives a pulley 136 which is secured to a shaft 136a having a central sprocket 136b (FIG. 6) which drives the feed chain 137 of the infeed conveyor 19 (about which more will be presently said).

The intermediate portion (FIGS. 6 and 9) of the shaft 47 of the shredding head 45 is of square cross section to non-rotatably mount two sets of alternatingly arranged plates 151 and 153, there being four plates 151 and three plates 153 in the particular embodiment of the invention shown. Each of the plates 151 and 153 is of square form having the corners removed and having a square hole 155 (FIG. 6) in the center to fit the square portion of the shaft 47. Each plate also has four bolt holes to accommodate bolts 157, the holes being formed in each plate about the square hole 155, such square hole and the associated bolt holes being 45° offset in each of plates 151 as compared to each of plates 153 so that the plates 151 are staggered relative to plates 153.

Spacer blocks 159 are disposed between the plates on the shaft 47 to properly space the plates. The plates and spacer blocks are clamped together by the bolts 157. The bolts extend through retainer plates 163 which have circular holes slidably fitting the circular portions 47b of shaft 47, up against the square central portion of the shaft to prevent endwise shifting of the plate assembly.

Each plate has a blade mounting pad 171 (FIGS. 7 and 8) permanently secured to each corner thereof, the pads being disposed in alternating fashion on the opposite faces of a plate. Bolted to each pad is a replaceable shredding blade or knife 173 which has serrated edges 175. The blades may comprise standard sickle blades. If a blade is damaged (such as by striking a rock or other hard object inadvertently packed in a bale) it may be readily replaced.

The bar set 57 (FIGS. 7 and 6) includes plural bars or teeth 57a which are spaced to provide gaps 57b which are so located that the alternately located blades of one plate pass on opposite sides of one bar and thus through the two gaps defined by such bar and the two adjacent bars.

The bar set has upwardly extending side arms 181 (FIG. 7) pivoted at 183 on the front and rear walls of the box 35 and urged by tension springs 185 against stop lugs 187 provided on the interior of the box 35.

The shredding head 45 rotates in a clockwise direction as the parts are shown in FIG. 6 so that if a hard object gets between the head blades or knives and the bar set, the bar will be flipped upwardly around the pivots 183 to allow the object to pass with a minimum of damage.

A curved guide plate 189 (FIG. 6) is provided on the interior of the box 35 and guides an entering bale properly toward the shredding head and holds the bale down on the floor 59a against the upward force imparted to the bale by the shredding blades or knives.

The infeed conveyor 19 (FIGS. 10–12) comprises an elongated fabricated channel member 201 having at its inboard end upright gusset plates 203 which are reinforced by various pieces including upright angle members 204 (FIG. 11) which are joined at their upper ends by a lintel piece 205 to define a rectangular discharge opening which registers with the inlet opening 39 of the shredder 17 in the operative position of the infeed conveyor. The rear upright angle member 204 (FIG. 5) has secured thereto a short upper ear 209 and a longer lower ear 211 which are pivotally mounted at 213 and 215, respectively, on ears 217 and 219, respectively, of a post 221. The lower end of the post is secured to side member 31a of the frame 31 while the upper end of the post is steadied by a brace 223 (FIG. 10).

The infeed conveyor is substantially horizontal (FIG. 2) when in its operative position, but when swung to its inoperative position it is somewhat upwardly inclined (FIG. 11) so that the rear end will clear the usual ground irregularities found in farming areas. To accomplish this inclined disposition of the conveyor, the ears 209, 211, 217 and 219 are dimensioned as above described and the upper pivot 213 is disposed slightly forwardly and outwardly of the lower pivot 215 as is evident from FIG. 11.

The feed chain 137 of the infeed conveyor may be of the hook link (draper) type having spaced feeder lugs 233 (FIG. 6), the chain being trained about inboard sprocket 136a (previously mentioned) and an outboard sprocket 237 (FIG. 12) so that the upper reach of the chain slides along the upper face of the channel member 201 in a central groove 241 in the channel member while the lower reach travels beneath the channel member.

The infeed conveyor 19 has a rearwardly located control level 251 (FIGS. 1 and 12) pivotally mounted thereon adjacent its outboard end and having a front handle 251a (FIG. 1) permitting the control lever to be operated from either side of the infeed conveyor 19. The lever 251 is of crank form at the rear side of conveyor 19 (FIG. 1) and secured to the crank portion is a control cable 253 which extends inwardly through suitable eyes or tackle or pulley blocks (not shown) to a sheave 254 mounted on pivot bolt 215, around such sheave to a pulley block 255 (mounted on the box 35) and thence upwardly to the outer end of a lever 256. Lever 256 is pivoted at 257 on the post 221. The tensioning pulley 133 is mounted on the inner end of lever 256.

When the control lever 251 is horizontal, as shown in FIG. 1, the cable is taut and the belt 129 (FIG. 5) is sufficiently tensioned by the idler pulley 133 to effect a drive to the pulley 127 and thence to the infeed conveyor. However, when the control lever 251 is raised, to slacken the cable 253, the lever 256 is freed and allows slack in the belt 129 so that the belt merely slips on the pulley 127 so the infeed conveyor is not driven. This permits the shredding head 45 and the discharge conveyor 21 to continue operating while the infeed conveyor is temporarily at rest.

The infeed conveyor 19 may be swung from its FIG. 10 operative position to its FIG. 11 inoperative position. In such latter position, the conveyor 19 is not only supported by the pivots 213 and 215 but also by a V rest 281 (FIGS. 10 and 11). The rest is carried on the outboard end of a slide bar 283 slidably supported by guides 285 on the frame 31. The bar has a handle 286 by which the rest 281 may be slid outwardly and swung upwardly to engage and slightly raise the infeed conveyor 19. The rest has an overcenter action when moved into engagement with the conveyor so that the weight of the conveyor releasably retains the rest in its active position.

When the infeed conveyor 19 is swung (manually) from its inoperative position to its operative position, a latch 289 (FIG. 11) on the box 35 may be actuated to detachably lock the infeed conveyor in the latter position.

The discharge conveyor 21 (FIGS. 10 and 13) comprises an elongate fabricated tubular duct member 301 of rectangular cross section having an enlarged rectangular mouth portion 303 (FIG. 6) to register with and fit against the outlet opening 41 of the shredder box 35 in the operative position of the discharge conveyor. In such position, the conveyor extends upwardly at an angle of approximately 45° (or any other desired angle) as shown in FIG. 10. The duct member 301 has a floor 304 (FIG. 13) along which shredded hay is moved in a manner to be presently described.

The duct member 301 shown is formed from sheet metal, and to support it there is provided a main support tube 305 which extends lengthwise of the duct member 301 and is secured thereto at spaced intervals by attachment pieces 307. The support tube 305 has a diverging leg 307 (FIG. 10) near its inboard end, the inboard ends of the tube 305 and the leg 307 having ears 305a and 307a (FIG. 5) pivotally mounted by pivots 310a and 310b on ears 309 and 311, respectively, which are provided, respectively, on the upper end of the post 221 and on the central member 31g of the frame 31. It is evident that the swinging axis of the discharge conveyor is inclined to the horizontal at approximately a 45° angle, and such axis is contained in a vertical plane which is slightly off normal relative to the longitudinal axis of the machine (the lower pivot being disposed slightly rearwardly of the upper pivot).

The discharge conveyor is raised and lowered by a double acting hydraulic cylinder 321 (FIGS. 1 and 10) which is pivotally mounted at 323 (FIG. 1) on the rear portion of the frame 31 and is pivotally connected at its upper end at 325 to an intermediate portion of the leg 307. Hoses (not shown) extend from the cylinder forwardly in paralleling relation to the hitch and drawbar and are detachably connected to a reversing type control valve (not shown) on the tractor. Operation of the valve one way lowers the discharge conveyor rearwardly and operation the other way raises the conveyor forwardly. The valve has a central blocking (inactive) position.

The drive to the discharge conveyor 21 is from the belt 117 (FIGS. 5 and 10) previously mentioned which passes through a retainer loop 331 on the box 35 and then passes by and in engagement with tensioning idler sheaves 333 and 335 and then around sheave 337. The latter is in fixed relation to a sheave 339 which drives a belt 45 which passes around and drives an outboard sheave 347. Both of the sheaves 337 and 339 are rotatably mounted on a plate 353 which is pivoted on the support tube 305. Sheaves 333 and 335 are mounted by bolt shafts on a slot plate 357 secured on the leg 307.

Outboard sheave 347 is fixed on a sprocket shaft 359 (FIG. 13) which is rotatably mounted on the outboard end of the discharge conveyor just beyond the outermost attachment piece 308 (FIG. 10). Shaft 359 carries twin sprockets 361 for a pair of spaced endless drive chains 363, which also pass around inboard sprockets 365 (FIG. 6). Sprockets 365 are secured to a shaft 367 which is rotatably mounted on the inboard end of the discharge conveyor 21.

Fixedly mounted on selected links of the drive chains 363 are spaced paddles 371 (FIGS. 6 and 13) which carry the shredded hay (which is thrown into the inboard end of the discharge conveyor) to the outboard end of the conveyor. The lower reaches of the chains 363 travel along slideways 373 supported from the duct member 301 by hanger pieces 325.

When the discharge conveyor 21 is in the operative position, a latch 387 on the box 35 may be actuated to detachably lock the conveyor to the box. When the discharge conveyor is pivoted rearwardly and downwardly to its inoperative transporting position, the main support tube 305 lowers into a curved rest 391 (FIG. 10) on the frame 31, there being a keeper pin 393 to releasably retain the tube 305 and thus the discharge conveyor from unwanted movement when the machine is driven from place to place.

The term "comminuting" as used in the claims is meant to be generic to include shredding, chopping, tearing, slicing, and otherwise dividing material.

Having described the invention in what is considered to be the preferred embodiment thereof, it is desired that it be understood that the invention is not to be limited other than by the provisions of the following claims.

I claim:

1. A shredding machine comprising:
 a wheeled frame having a longitudinal axis parallel to which it is adapted to travel,
 a comminuting unit on said frame open in a transverse direction for entrance of material to be comminuted on one side and exit of comminuted material on the other,
 feeding means for feeding material to be comminuted into said comminuting unit at said one side thereof,
 discharge means provided for the discharge of comminuted material from said unit in predetermined direction,
 one of said means including an elongate conveyor,
 and means mounting said conveyor for movement from an operative transverse position registering with said comminuting unit to an inoperative position longitudinally of said frame,
 said one conveyor being a discharge conveyor which in its operative position extends upwardly and outwardly from said comminuting unit and in its inoperative position has its outer end at a lower level than said end occupies in its operative position.

2. A shredding machine comprising:
 a wheeled frame having a longitudinal axis parallel to which it is adapted to travel,
 a comminuting unit on said frame open in the transverse direction for entrance of material to be comminuted on one side and exit of comminuted material on the other,
 feeding means for feeding material to be comminuted into said comminuting unit at said one side thereof,
 discharge means provided for the discharge of comminuted material from said unit in a predetermined direction,
 one of said means including an elongate conveyor,
 and means mounting said conveyor for movement from an operative transverse position registering with said comminuting unit to an inoperative position longitudinally of said frame,
 said one conveyor being a discharge conveyor which in its operative position extends upwardly and outwardly from said comminuting unit and in its inoperative position has its outer end at a lower level than said end occupies in its operative position, and said mounting means comprising an upper pivot remote from the inner end of said discharge conveyor and a lower pivot next to said inner end whereby said pivots control the movement of said discharge conveyor so that it pivots from its upwardly inclined position downwardly and toward general parallelism with said longitudinal axis.

3. A shredding machine as set forth in claim 2, wherein said frame has a forward end and a rear end and wherein said pivots are adjacent the rear of said comminuting unit whereby said discharge conveyor assumes a trailing rearwardly extending position in its inoperative condition.

4. A shredding machine as set forth in claim 2, wherein said frame has a forward end and a rear end and wherein said pivots are adjacent the rear of said comminuting unit whereby said discharge conveyor assumes a trailing, rearwardly extending position in its inoperative condition, and
   wherein said feeding means comprises an elongate infeed conveyor,
      and second mounting means mounting said infeed conveyor for movement from a transverse operative position in alignment with said comminuting unit to an inoperative position longitudinally of said frame.

5. A shredding machine as set forth in claim 2, wherein said frame has a forward end and a rear end and wherein said pivots are adjacent the rear of said comminuting unit whereby said discharge conveyor assumes a trailing, rearwardly extending position in its inoperative condition, and
   wherein said feeding means comprises an elongate infeed conveyor,
      and second mounting means mounting said infeed conveyor for movement from a transverse operative position in alignment with said comminuting unit to an inoperative position longitudinally of said frame,
   and wherein there is a drive shaft at the forward end of said frame and drive means establishing a driving connection from said shaft to said unit and both conveyors.

6. A shredding machine as set forth in claim 5, wherein there are means for interrupting the drive to said infeed conveyor without interrupting the drive to said unit or said discharge conveyor.

7. A shedding machine as set forth in claim 5, wherein said second mounting means comprises upper and lower pivots adjacent the rear of said unit and the inner end of said infeed conveyor,
   wherein said drive means includes a generally vertically oriented flexible drive for said infeed conveyor disposed adjacent the axis between the associated pivots,
   and wherein said drive means includes a flexible drive to said discharge conveyor from said unit.

References Cited
UNITED STATES PATENTS

| | | | |
|---|---|---|---|
| 2,681,090 | 6/1954 | Hicks | 241—101 |
| 3,005,637 | 10/1961 | Hetteen | 241—190 X |
| 3,176,926 | 4/1965 | Hobbs | 241—101 |
| 3,199,796 | 8/1965 | Callum | 241—101 |
| 3,208,491 | 9/1965 | Bliss | 241—190 X |
| 3,375,985 | 4/1968 | Dodgen | 241—101 X |
| 3,395,868 | 8/1968 | Dodgen | 146—71 X |

LESTER M. SWINGLE, Primary Examiner

D. G. KELLY, Assistant Examiner